(12) United States Patent
Park et al.

(10) Patent No.: US 7,952,563 B2
(45) Date of Patent: May 31, 2011

(54) TOUCH POSITION DETECTING DEVICE, METHOD OF DETECTING TOUCH POSITION AND TOUCH SCREEN DISPLAY DEVICE HAVING THE SAME

(75) Inventors: Jong-Woung Park, Seongnam-si (KR); Hyung-Guel Kim, Yongin-si (KR); Joo-Hyung Lee, Gwacheon-si (KR); Man-Seung Cho, Seoul (KR); Kee-Han Uh, Yongin-si (KR); Young-Ok Cha, Gwangmyeong-si (KR)

(73) Assignee: Samsung Electronics Co., Ltd. (KR)

( * ) Notice: Subject to any disclaimer, the term of this patent is extended or adjusted under 35 U.S.C. 154(b) by 909 days.

(21) Appl. No.: 11/322,933

(22) Filed: Dec. 30, 2005

(65) Prior Publication Data

US 2006/0146038 A1      Jul. 6, 2006

(30) Foreign Application Priority Data

Dec. 31, 2004   (KR) .................. 10-2004-0117752

(51) Int. Cl.
    *G06F 3/041* (2006.01)
(52) U.S. Cl. ..................................... 345/173; 178/18.01

(58) Field of Classification Search .......... 345/173–179; 178/18.01–18.11, 19.01–19.07
See application file for complete search history.

(56) References Cited

U.S. PATENT DOCUMENTS

| | | | | |
|---|---|---|---|---|
| 4,680,429 | A * | 7/1987 | Murdock et al. ........... | 178/20.02 |
| 4,899,138 | A * | 2/1990 | Araki et al. ................... | 345/175 |
| 5,334,805 | A * | 8/1994 | Knowles et al. ............ | 178/18.04 |
| 5,481,278 | A * | 1/1996 | Shigematsu et al. .......... | 345/179 |
| 6,137,482 | A * | 10/2000 | Kim ............................. | 345/179 |
| 6,424,844 | B1 * | 7/2002 | Lundqvist ..................... | 455/566 |
| 6,940,494 | B2 * | 9/2005 | Hoshino et al. ............... | 345/173 |
| 7,274,424 | B1 * | 9/2007 | Kurihara et al. .............. | 349/155 |

* cited by examiner

*Primary Examiner* — Kevin M Nguyen
*Assistant Examiner* — Kenneth B Lee, Jr.
(74) *Attorney, Agent, or Firm* — Cantor Colburn LLP

(57) ABSTRACT

A touch position detecting method, a device using the method, and a touch screen display device having the device are disclosed. A touch sensing unit senses a touch event and outputs a sensing data. A reference update unit updates a reference data with an n-th frame sensing data provided from the touch sensing unit, based on a predetermined update signal. A position detecting unit detects the touch position by using the reference data and an (n+i)-th frame sensing data from the touch sensing unit. Therefore, the touch position is easily detected by determining a difference between the reference data and the sensing data at a certain time.

29 Claims, 11 Drawing Sheets

TOUCH POSITION DETECTING DEVICE, METHOD OF DETECTING TOUCH POSITION AND TOUCH SCREEN DISPLAY DEVICE HAVING THE SAME

This application claims priority to Korean Patent Application No. 2004-117752, filed on Dec. 31, 2004 and all the benefits accruing therefrom under 35 U.S.C. §119, and the contents of which in its entirety are herein incorporated by reference.

BACKGROUND OF THE INVENTION

1. Field of the Invention

The present invention relates to a touch position detecting device, a method of detecting a touch position, and a touch screen display device having the touch position detecting device. More particularly, the present invention relates to a touch position detecting device facilitating detection of a touch position, a method of detecting a touch position, and a touch screen display device having the touch position detecting device.

2. Description of the Related Art

Generally, a touch screen panel is an inputting device disposed on a liquid crystal display ("LCD") panel in order to input data by a finger or a physical object such as a pen. The touch screen panel includes a first substrate, a second substrate that is spaced apart from the first substrate, a first transparent electrode, and a second transparent electrode formed on the first substrate and the second substrate such that the first and second transparent electrodes face each other.

An LCD device and the touch screen panel are combined through an adhesive, so that an empty gap is created between the touch screen panel and the LCD panel. Therefore, an air gap or the adhesive, which has different refractivity from that of the LCD device and/or the touch screen panel, is disposed between the LCD panel and the touch panel device, thereby deteriorating optical properties of the LCD device.

In order to solve the above-mentioned problem, a touch screen panel has been integrated with an LCD panel by optical sensors. Hereinafter, an LCD panel having the touch screen panel integrated therewith is referred to as a "touch screen LCD panel".

When the touch screen panel employs optical sensors including an amorphous silicon/polysilicon a-Si/Poly-Si thin-film transistor ("TFT"), etc., touch positions within the touch screen panel are measured by processing sensing data provided from the optical sensors. In view of the signal processing and hardware structure, there are some drawbacks.

First, the sensing data is non-uniform, and includes ripple noise to some degree. Additionally, the sensing data may interfere with an image data signal to create noise, thereby lowering a signal-to-noise ratio ("SNR"), and making exact detection of the touch position difficult.

Second, since a process for the sensing data is performed within one frame interval (1H=$\frac{1}{60}$ Hz), the integrated LCD touch panel necessarily detects one touch position within 13 ms, supposing a duration margin of 20%. For example, a 200 ppi Quarter Quarter Video Graphics Array ("QQVGA") display device having 160×120 touch sensors is required to process 160×120 sensing data within 13 ms. Thus, the panel has a somewhat heavy process load.

Third, much time is consumed when the sensing data is processed by using a segment method and a pre-processing method, which include a smoothing filter (low-pass filter), a sharpening filter (high-pass filter), an additional image transferring process, and a mapping process for transferred images.

BRIEF SUMMARY OF THE INVENTION

The invention provides a touch position detecting device for simplifying a process of detecting a touch position.

The invention also provides a touch position detecting method for simplifying the process of detecting a touch position.

The invention also provides a touch screen display device having the touch position detecting device.

In one exemplary embodiment, a touch position detecting device includes a touch sensing unit, a reference update unit, and a position detecting unit. The touch sensing unit senses a touch event and outputs a sensing data. The reference update unit updates a reference data stored in the reference update unit with an n-th frame sensing data provided from the touch sensing unit, based on a predetermined update signal. The position detecting unit detects the touch position by using the reference data and an (n+i)-th frame sensing data provided from the touch sensing unit.

The touch position detecting device may further include a memory storing the reference data, and may further include an additional memory storing the sensing data provided from the touch sensing unit.

The position detecting unit may estimate the touch position by determining a difference between the reference data and the (n+i)-th frame sensing data.

The update signal may include a turn-on signal indicating that the device turns on or a wake-up signal indicating that the device wakes from an idle state.

The touch position detecting device may further include a post-event sensing unit sensing a physical object being apart from the touch sensing unit and outputting a post-event sensing signal. The update signal may further include the post-event sensing signal.

The sensing data may include a background sensing data. The position detecting unit may further include a calculation unit deciding whether to update the reference data with the sensing data, when a level of an object sensing data is lower than a level of the background sensing data.

The calculation unit decides whether to update the reference data, based on a difference of levels between the object sensing data of the current sensing data and the object sensing data of the following sensing data. The calculation unit may decide to update the reference data, when the difference of levels is larger than a predetermined critical degree.

The calculation unit may update the reference data by the sensing data at about a moment when the difference of levels stops increasing and then begins decreasing. The calculation unit may update the reference data with the sensing data corresponding to a moment before the difference of levels begins to decrease, that is, when the difference of levels stops increasing and then begins decreasing.

The touch position detecting device may further include a sensing signal adjusting unit receiving the sensing data and adjusting the sensing data to be at a constant level, wherein the sensing signal adjusting unit provides the update signal to the reference update unit when the sensing data is maintained at a constant level. If the sensing data is not within a predetermined range, one of a gate voltage adjusting operation, an amplification gain adjusting operation, and a backlight adjusting operation is performed until the sensing data is within the predetermined range. The sensing signal adjusting unit thus may further include at least one of a gate voltage adjusting unit, an amplification gain adjusting unit, and a backlight adjusting unit for adjusting the sensing data to fall within the predetermined range.

The touch position detecting device may also further include a filter eliminating a noise element by comparing a previously detected touch position with a touch position currently detected.

In another exemplary embodiment, a method for touch position detecting, such as on a touch screen liquid crystal display device, includes a step for updating a reference data with a sensing data indicating that a touch event occurs, according to an update control signal externally provided, and a step for detecting a touch position data corresponding to a position at which the touch event occurs, by using the sensing data and the reference data.

The method may further include generating a post-event sensing signal indicating that the touch event is over, and examining whether the method is performed as a shadow mode or a backlight mode, according to the post-event sensing signal. The updating of the reference data may include updating the reference data by the sensing data when the method is performed as the backlight mode.

The method may further include deciding whether to update the reference data with the sensing data, when the method is performed under the shadow mode.

In another exemplary embodiment, a touch screen display device includes a display panel, a sensing unit, and a touch position detecting unit. The display panel displays images by the frame. The sensing unit senses a touch event by the frame to output a sensing data by the frame. The touch position detecting unit updates a reference data with the sensing data, based on an update control signal, and to estimate a touch position data corresponding to the touch event position by using the reference data and the sensing data.

The sensing unit may be integrated on the display panel, which may include an array substrate, a color filter substrate, and a liquid crystal layer interposed between the array substrate and the color filter substrate. The sensing unit may be integrated into the array substrate.

The touch position detecting unit may include a reference updating unit, a memory, and a position detecting unit. The reference updating unit updates the reference data with the sensing data, based on the update signal. The memory stores the reference data. The position detecting unit detects the touch position data by determining a difference between the reference data and the sensing data.

The sensing unit may further include a first sensor configured to recognize that an object is detached from the display panel, and to output a post-event sensing signal, indicating that the object is detached from the display panel, to the reference updating unit.

The reference updating unit may be configured to decide whether an operation mode is a shadow mode or a backlight mode, and to update the reference data with the sensing data, according to the operation mode, when the post-event sensing signal is received.

The reference updating unit updates the reference data with the sensing data, when the operation mode is determined to be the backlight mode based on an internal light.

The device may further include a calculation unit configured to decide whether to update the reference data with the sensing data, when the operation mode is determined to be the shadow mode.

The sensing data may include an object sensing data and a background sensing data, and the device may further include a sensing signal adjusting unit configured to stabilize a difference between the object sensing data and the background sensing data.

The sensing signal adjusting unit may be configured to provide the touch position detecting unit with an update signal, when the difference between the object sensing data and the background sensing data is stabilized.

Therefore, the touch position is easily detected by determining a difference between the reference data and sensing data at a certain time.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF THE INVENTION

Figure 1:
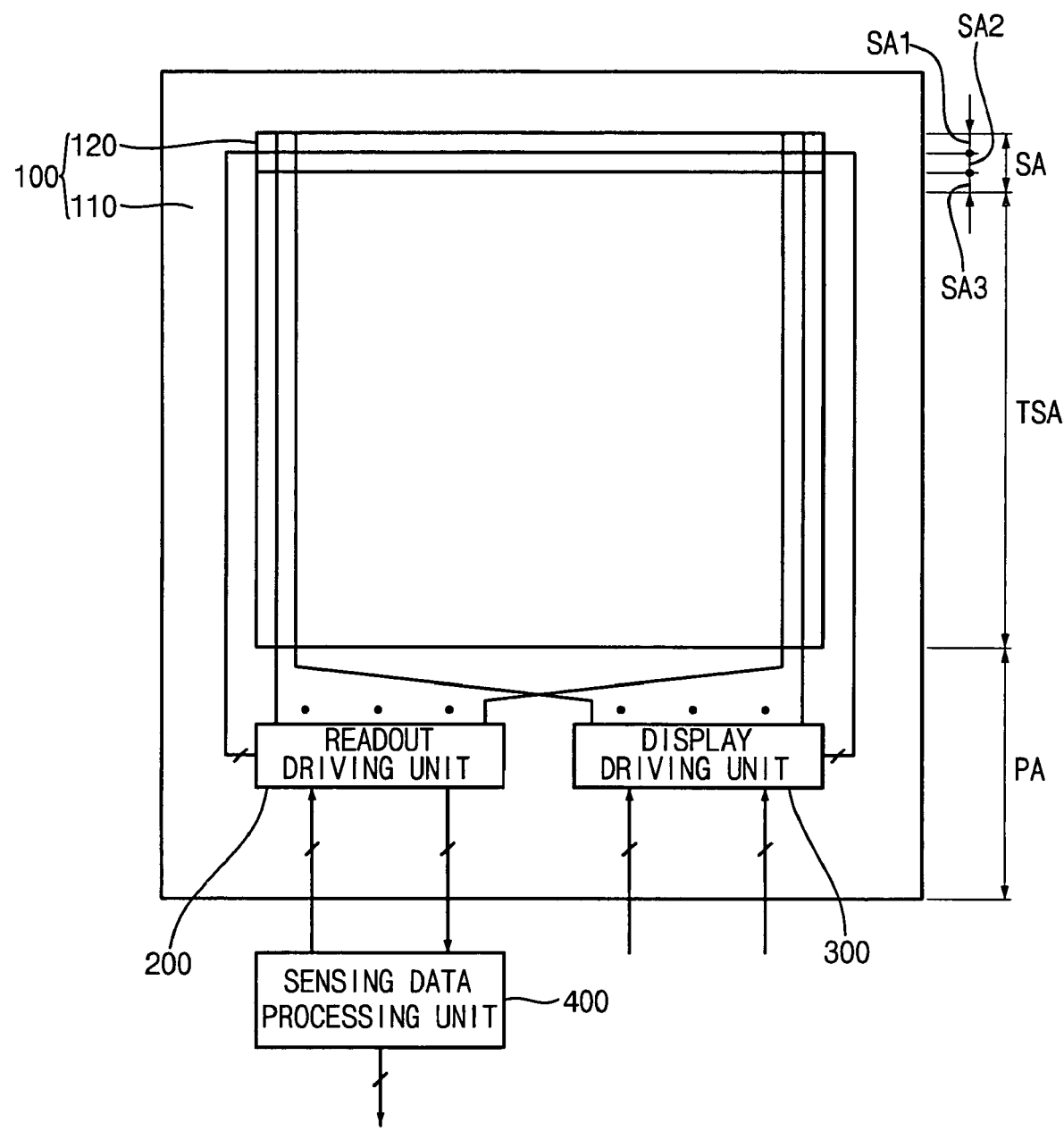
FIG. 1 is a plan view illustrating an exemplary embodiment of a display device according to the invention.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

FIG. 1 is a plan view illustrating an exemplary embodiment of a display device according to the invention.

Referring to FIG. 1, the display device includes a display panel 100, a readout driving unit 200, a display driving unit 300, and a sensing data processing unit 400.

The display panel 100 includes an array substrate 110, a color filter substrate 120, and a liquid crystal layer 130 (shown in FIG. 3) disposed between the array substrate 110 and the color filter substrate 120.

The array substrate 110 includes a touch screen region TSA, a sensing region SA, and a peripheral region PA, where the touch screen region TSA may be positioned between the sensing region SA and the peripheral region PA. The touch screen region TSA corresponds to a region in which the display panel 100 is integrated with a touch screen panel. A plurality of display switching elements for driving pixels, and a plurality of touch sensors are formed on the touch screen region TSA.

The sensing region SA includes a first sensing region SA1, a second sensing region SA2, and a third sensing region SA3. The first sensing region SA1 has a plurality of first sensors sensing an external light amount. The first sensors may have a similar structure as the touch sensors formed on the touch screen region TSA. The second sensing region SA2 has a plurality of second sensors sensing the amount of reflected light that is generated from a backlight unit (or an internal light). The second sensors may have a similar structure as that of the touch sensors formed on the touch screen region TSA but further include a reflection plate for blocking the external light.

The third sensing region SA3 includes a plurality of third sensors for sensing a detachment of a physical object from the touch screen region TSA. The first, second, and third sensors of the sensing region SA as well as the touch sensors of the touch screen region TSA may form a sensing unit as will be further described below.

The peripheral region PA includes the readout driving unit 200 and the display driving unit 300. The readout driving unit 200 controls the touch sensors and the first, second, and third sensors in the first, second, and third sensing regions SA1, SA2, SA3, respectively, and reads sensing signals provided from these sensors. The display driving unit 300 controls the display switching elements and provides the display switching elements with drive signals.

The color filter substrate 120 includes color filter patterns having, for example, red, green, and blue patterns corresponding to the touch screen region TSA. The color filter patterns allow the backlight to penetrate and reproduce a color. The color filter substrate 120 may further include a common electrode forming part of a liquid crystal capacitor with a pixel electrode on the array substrate 110. The color filter patterns may alternatively be formed on or under the pixel electrodes on the array substrate 110.

In one end of the peripheral region PA of the array substrate 110, a flexible printed circuit board ("PCB") having various processing circuits is formed to electrically couple the processing circuits with the readout driving unit 200 and the display driving unit 300. The sensing data processing unit 400 is formed on the flexible PCB to be electrically coupled to the readout driving unit 200.

The readout driving unit 200 provides the touch sensors formed on the touch screen region TSA with control signals. The readout driving unit 200 also provides the first, second, and third sensors formed on the first, second, and third sensing regions SA1, SA2, and SA3, respectively, with control signals. Additionally, the readout driving unit 200 converts sensing signals detected by the touch sensors and the first, second, and third sensors into sensing data. The sensing data corresponds to a digital signal. The sensing data is applied to the sensing data processing unit 400.

The display driving unit 300 drives the display switching elements formed on the touch screen region TSA, by using video data signals and video control signals provided by an external graphic device, so that images may be displayed on the display panel 100 of the touch screen region TSA.

The sensing data processing unit 400 detects the touch position, based on the sensing data provided by the readout driving unit 200. In order to detect the touch position, the sensing data processing unit 400 stores reference data, and determines a difference between the reference data and current frame data. Further, the sensing data processing unit 400 maintains the touch sensing data provided from the readout driving unit 200 at a predetermined level. By maintaining the touch sensing data at a predetermined level, the problem of non-uniform data making exact detection of touch position difficult is eliminated.

Figure 2:
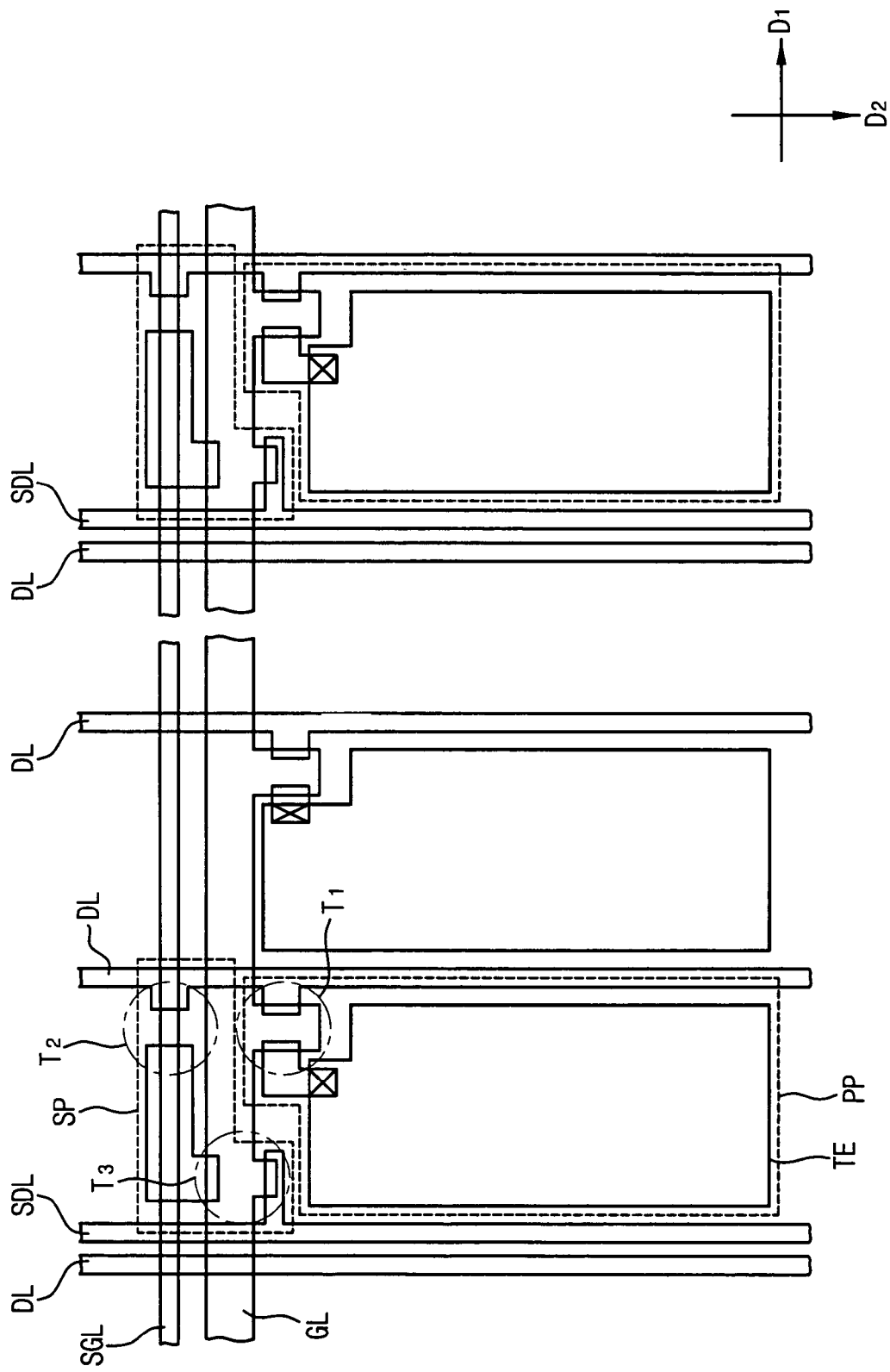
FIG. 2 is a layout view illustrating an exemplary touch sensor and an exemplary display switching element in FIG. 1.
Figure 3:
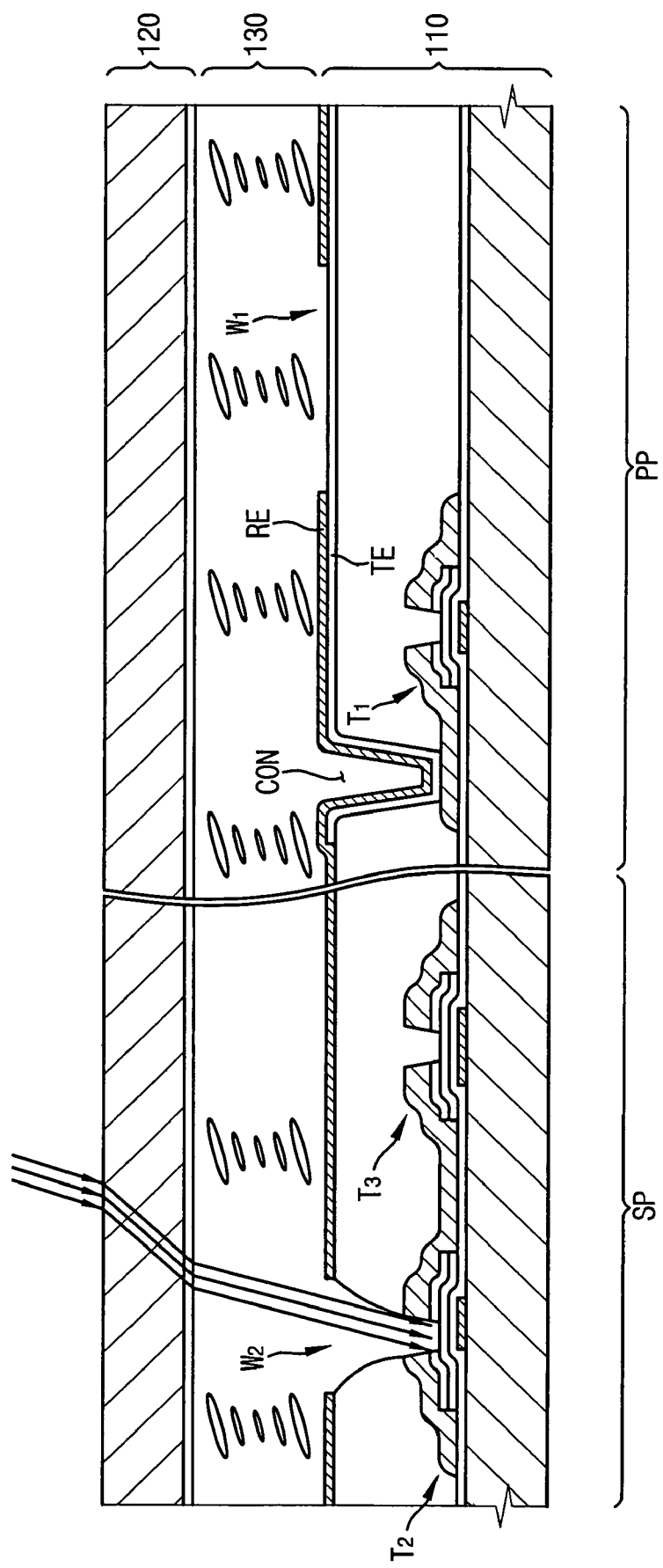
FIG. 3 is a cross sectional view illustrating the display device having an exemplary touch sensor and an exemplary display switching element formed within a touch screen region in FIG. 1.

FIG. 2 is a layout view illustrating an exemplary touch sensor and an exemplary display switching element in FIG. 1. FIG. 3 is a cross sectional view illustrating the display device having an exemplary touch sensor and an exemplary display switching element formed within the touch screen region in FIG. 1.

Referring to FIGS. 2 and 3, each of the image regions includes a pixel part PP and a sensing part SP.

The display switching element T1 (hereinafter referred to as a first TFT) is formed on the pixel part PP and is driven by the display driving unit 300 for displaying images on the display panel 100 of the touch screen region TSA. The first TFT T1 is electrically coupled to a gate line GL and a data line DL. The gate line GL is extended in a first direction D1 and the data line DL is extended in a second direction D2 that is substantially perpendicular to the first direction D1. The gate line GL and the data line DL cross over each other but are electrically insulated from each other. The pixel part PP further includes a transparent electrode TE and a reflective electrode RE, both disposed on an insulating layer covering the first TFT T1. It should be understood that the pixel part PP includes a plurality of each of the above-described elements within the display panel 100.

The sensing part SP includes the touch sensor T2 (hereinafter referred to as a second TFT), a third TFT T3, and a sensing data line SDL. The second TFT T2 is driven by an external light. The third TFT T3 is electrically coupled to the second TFT T2. The sensing data line SDL is electrically coupled to the third TFT T3, and extended in the second direction D2, generally parallel to the data line DL. The sensing part SP further includes a sensor gate line SGL that is extended in the first direction D1, generally parallel to the gate line GL. A predetermined control signal provided from the readout driving unit 200 is applied to the sensor gate line SGL.

The second TFT T2 includes a gate electrode branched from the sensor gate line SGL, a source electrode branched from the data line DL, and a drain electrode coupled to the third TFT T3. The sensor gate line SGL is formed from the same layer as the gate line GL, but is electrically isolated from the gate line GL. That is, the sensor gate line SGL is separated from the gate line GL.

The third TFT T3 includes a gate electrode branched from the gate line GL, a source electrode electrically coupled to the source electrode of the second TFT T2, and a drain electrode branched from the sensing data line SDL. The sensing data line SDL is formed from the same layer as the data line DL, but is electrically isolated from the data line DL. That is, the sensing data line SDL is separated from the data line DL.

The transparent electrode TE is formed on a part of an insulation layer. The insulation layer covers the first, second, and third TFTs T1, T2, and T3 as shown in FIG. 3. The insulation layer includes a contact hole CON that exposes the drain electrode of the first TFT T1. The transparent electrode TE is electrically coupled to the drain electrode of the first TFT T1 through the contact hole CON. The transparent electrode TE includes a transparent conductive material, such as, but not limited to, indium tin oxide ("ITO") and indium zinc oxide ("IZO").

The reflective electrode RE is formed on a portion of the transparent electrode TE, and on a portion of the insulation layer such as on a portion where the transparent electrode TE does not cover the insulation layer. The reflective electrode RE has a pass window W1 and an open window W2. The pass window W1 is formed by etching or otherwise removing a portion of the reflective electrode RE to expose the transparent electrode TE under the portion of the reflective electrode RE, and the pass window W2 is formed by etching or otherwise removing another portion of the reflective electrode RE and the insulation layer above the second TFT T2 to expose the second TFT T2. The reflective electrode RE includes highly reflective materials. The reflective electrode RE may have a single layered structure. When the reflective electrode RE has a single layered structure, the reflective electrode RE includes aluminum neodymium (AlNd). Alternatively, the reflective electrode RE may have a double layered structure. When the reflective electrode RE has a double layered structure, the reflective electrode RE includes aluminum neodymium (AlNd) layer and molybdenum tungsten (MoW) layer. While particular embodiments for the reflective electrode RE have been described, it should be understood that alternative embodiments for the materials of the reflective electrode RE would also be within the scope of these embodiments.

The pass window W1 corresponds to a transmissive region. The pass window W1 allows the backlight provided from the backlight assembly positioned below the array substrate 110 to pass through the window W1. The reflective electrode RE corresponds to a reflective region. The reflective electrode RE reflects an external light that arrives at the reflective electrode through the touch screen region TSA.

The pass window W2 exposes the second TFT T2, so that the second TFT T2 easily receives an external incident light that is provided intentionally by a user from an exterior of the LCD panel 100.

The reflective electrode RE that covers the first TFT T1 and the third TFT T3 but not the second TFT T2, prevents the first TFT T1 and the third TFT T3 from responding to the external incident light, while the second TFT T2 responds to the external incident light, such as a light produced by a light pen or a backlight reflected at a user's finger and therefore forms the touch sensors of the touch screen region TSA.

Thus, as can be appreciated from FIG. 2 and FIG. 3, the display device of the present invention integrates both touch sensing and image displaying capabilities and thus provides a touch screen LCD panel.

Figure 4:
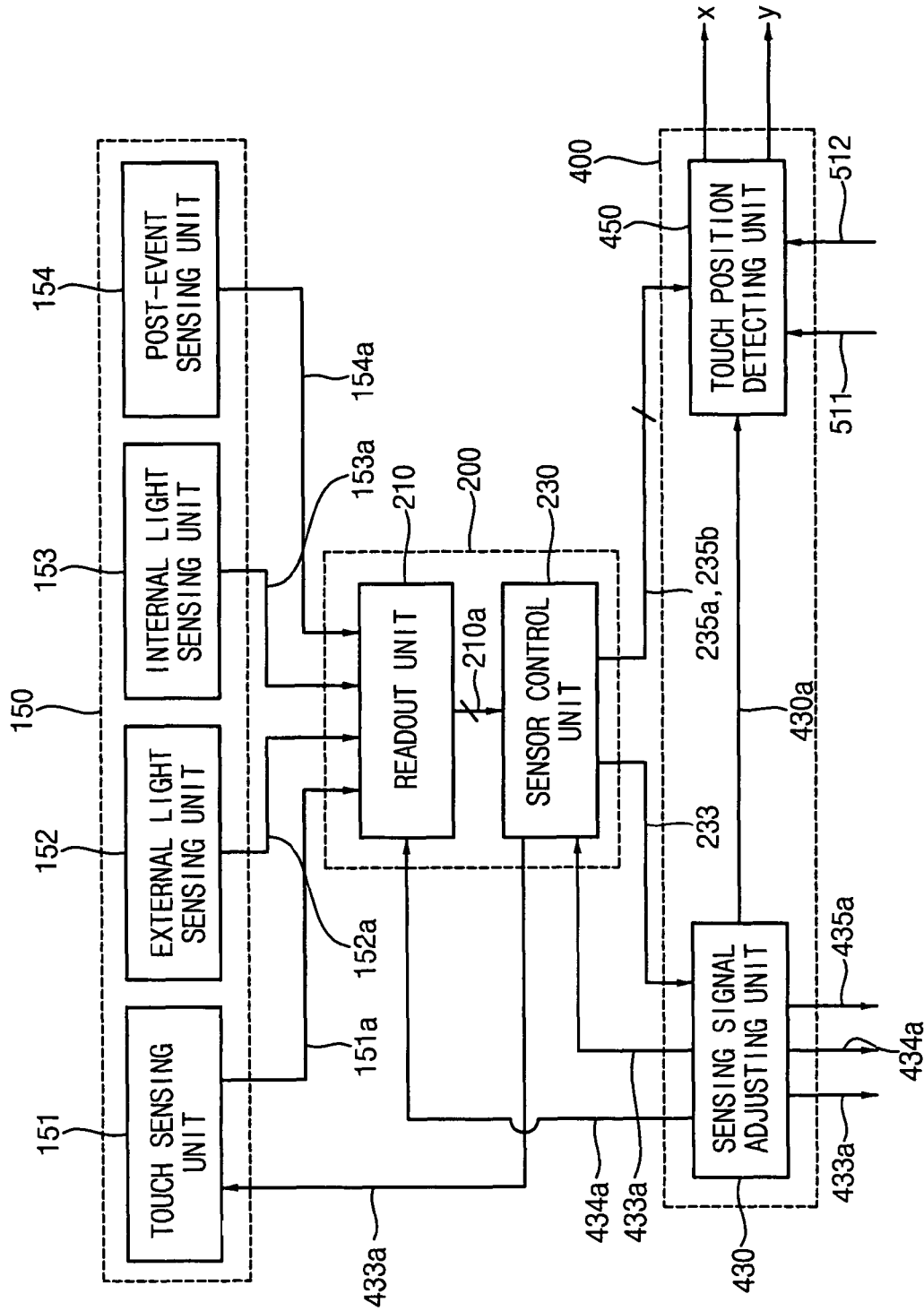
FIG. 4 is a block diagram illustrating the display device in FIG. 1.

FIG. 4 is a block diagram illustrating the display device in FIG. 1.

Referring to FIG. 1 and FIG. 4, the display device includes a sensing unit 150, a readout unit 210, a sensor control unit 230, a sensing signal adjusting unit 430, and a touch position detecting unit 450.

The sensing unit 150 includes a touch sensing unit 151, an external light sensing unit 152, an internal light sensing unit 153, and a post-event sensing unit 154. For example, the touch sensing unit 151 includes the touch sensors formed on the touch screen region TSA and provides the readout unit 210 with sensing signal 151a sensed by the touch sensors, after being processed by a frame.

The external light sensing unit 152 includes the first sensors formed on the first sensing region SA1, and provides the readout unit 210 with an external light sensing signal 152a, which is sensed by the first sensors formed on the first sensing region SA1.

The internal light sensing unit 153 includes the second sensors formed on the second sensing region SA2, and provides the readout unit 210 with internal light sensing signal 153a, which is sensed by the second sensors formed on the second sensing region SA2.

The post-event sensing unit 154 includes the third sensors formed on the third sensing region SA3, and provides the readout unit 210 with a post-event sensing signal 154a sensed by the third sensors formed on the third sensing region SA3. The post-event sensing signal 154a indicates that the physical object, whether a finger, pen, or the like, is detached from the touch screen region TSA.

The readout unit 210 receives the sensing signals 151a, 152a, 153a, and 154a from the sensing unit 150, and converts the sensing signals 151a, 152a, 153a, and 154a into a sensing data group 210a in digital form to provide the sensor control unit 230 with the sensing data group 210a. The readout unit 210 and the sensor control unit 230 are both included in the readout driving unit 200.

The sensor control unit 230 provides the sensors of the sensing unit 150 with sensor gate signals, and also provides corresponding process units in the sensing data processing unit 400 with sensing data received from the readout unit 210, for a following data process. For example, the sensor control unit 230 provides the sensing signal adjusting unit 430 with a sensing data group 233 including the external light sensing data processed from the external light sensing signal 152a and the internal light sensing data processed from the internal light sensing signal 153a. The sensor control unit 230 provides the touch position detecting unit 450 with touch sensing data 235a and a post-event sensing signal 235b. The sensing signal adjusting unit 430 and the touch position detecting unit 450 are both included in the sensing data processing unit 400.

The sensing signal adjusting unit 430 stabilizes a level of a touch position sensing data corresponding to a position where a touch event happens on the touch screen region TSA, based on the sensing data group 233 provided by the sensor control unit 230. Particularly, the sensing signal adjusting unit 430 adjusts the touch position sensing data based on the sensing data group 233 to be at a constant level, by determining the difference between the external light sensing data and the internal light sensing data, processed from the external light sensing signal 152a and the internal light sensing signal 153a. The sensing signal adjusting unit 430 outputs sensor control signals 433a, 434a, and 435a, which maintain the touch position sensing data at a constant level for preventing difficulties in making exact detection of the touch positions.

The control signal 433a corresponds to a gate voltage Vg applied to the touch sensing unit 151. The control signal 434a corresponds to an amplification gain AG applied to the readout unit 210. The control signal 435a is for adjusting the backlight brightness of a backlight assembly. The sensing signal adjusting unit 430 applies an update control signal 430a to the touch position detecting unit 450, when the touch position sensing data is maintained at a constant level by the control signals 433a, 434a, and 435a.

The touch position detecting unit 450 updates the reference data with a frame of the touch sensing data 235a, based on preset conditions. The touch position detecting unit 450 detects a position data (X,Y) corresponding to the position where a touch event happens within the touch screen region TSA, by figuring out, in other words determining, a difference between the touch sensing data 235a and the updated reference data, as will be further described below.

The sensor controlling unit 230 provides the touch position detecting unit 450 with the touch sensing data 235a and the post-event sensing signal 235b. The touch sensing data 235a corresponds to digitalized and framed sensing signals processed from the sensing signal 151a provided by the touch sensing unit 151 and the post-event sensing signal 235b corresponds to the digitalized sensing signal processed from the post-event sensing signal 154a provided by the post-event sensing unit 154.

The update signals provided to the touch position detecting unit 450 include the post-event sensing signal 235b, the update control signal 430a, a turn-on signal 511, and a wake-up signal 512. The turn-on signal 511 indicates that the display device is turned on, and the wake-up signal 512 indicates that the display device wakes up from a sleep mode.

Figure 5:
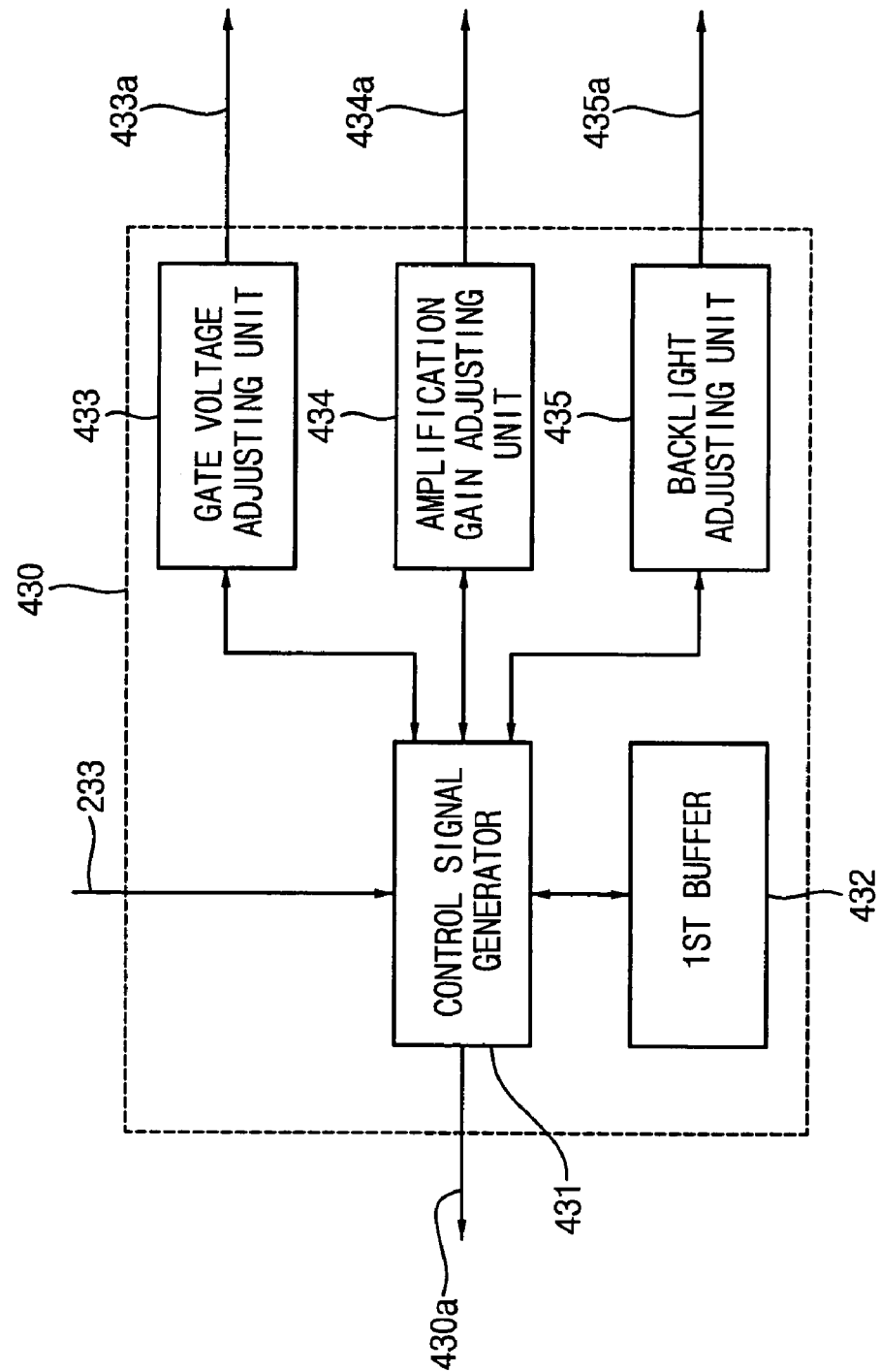
FIG. 5 is a block diagram illustrating the exemplary sensing signal adjusting unit of FIG. 4.

FIG. 5 is a block diagram illustrating the exemplary sensing signal adjusting unit of FIG. 4.

Referring to FIG. 4 and FIG. 5, the sensing signal adjusting unit 430 includes a first controller 431, a first buffer 432, a gate voltage adjusting unit 433, an amplification gain adjusting unit 434, and a backlight adjusting unit 435.

The sensor control signals 433a, 434a, and 435a are provided by the gate voltage adjusting unit 433, the amplification gain adjusting unit 434, and the backlight adjusting unit 435, respectively. More particularly, the sensor control signal 433a is a gate voltage Vg signal, the sensor control signal 434a is an amplification gain AG, and the sensor control signal 435a is a backlight control level signal BLC.

The first controller 431, identified as a control signal generator, adjusts the adjusting units 433, 434, and 435 to stabilize the touch position sensing data, by comparing the external light sensing data processed from the external light sensing signal 152a with the internal light sensing data processed from the internal light sensing signal 153a. The external light sensing data and the internal light sensing data are provided to the first controller 431 by the sensing data group 233 from the sensor control unit 230. When the touch position sensing data is stabilized, the first controller 431 applies the update control signal 430a to the touch position detecting unit 450.

Figure 6:
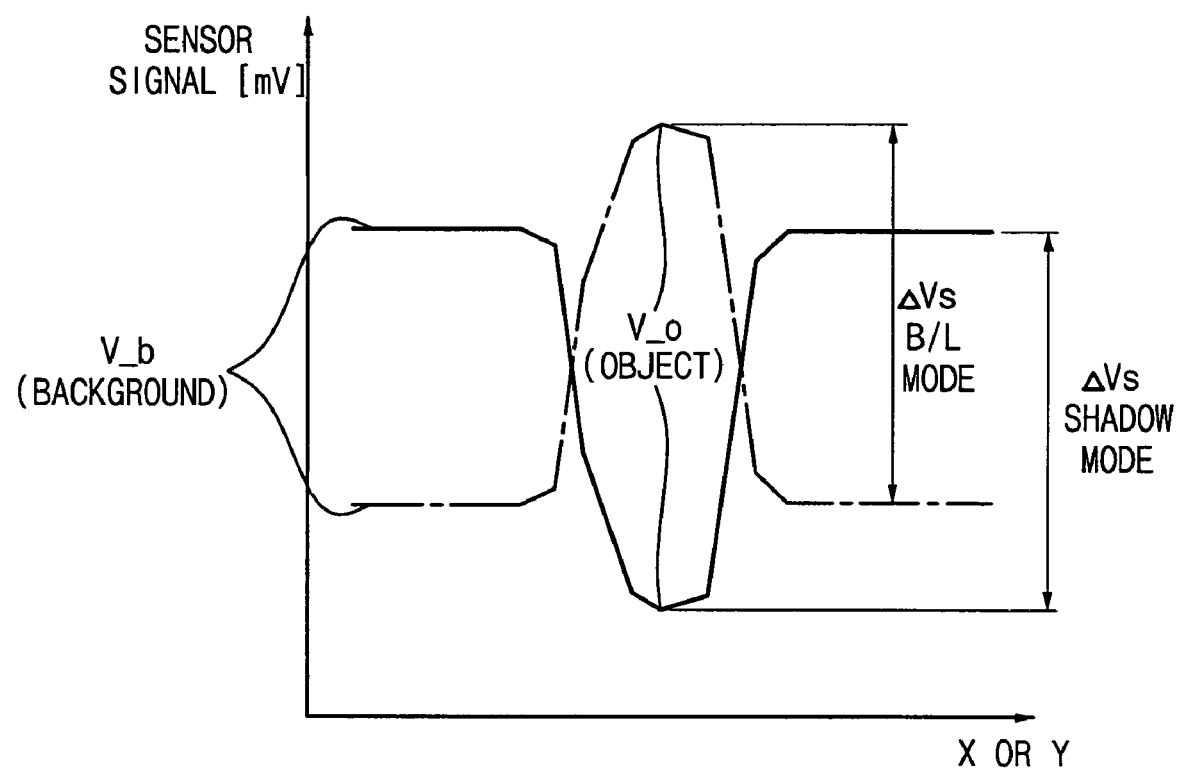
FIG. 6 is a graph illustrating experimental touch sensing data.

FIG. 6 is a graph illustrating experimental touch sensing data.

In the graph of FIG. 6, the x-axis indicates an x-coordinate or a y-coordinate position on the touch screen region TSA, while the y-axis indicates a voltage level of sensing data detected by the touch sensors in analog or digital form.

As shown in FIG. 6, the touch sensing data includes background sensing data V_b and object sensing data V_o. When an object is far from the touch screen region TSA, a sensing signal, which may contain noise, external lights, etc., and which may be nearly constant, corresponds to the background sensing data V_b. When the object approaches the touch screen region TSA such that a sensing signal is varied and then is eventually stabilized, the stabilized sensing signal corresponds to the object sensing data V_o.

A first case, in which the external light amount is larger than the internal light amount or the backlight amount, is referred to as a shadow mode. In the shadow mode, the background sensing data V_b is larger than the object sensing data V_o.

On the other hand, a second case, in which the internal light amount or the backlight amount is larger than the external light amount is referred to as a backlight mode. In the backlight mode, the background sensing data V_b is smaller than the object sensing data V_o.

Differences between the background sensing data V_b and the object sensing data V_o may be used for the touch position sensing data ΔVs. The touch position sensing data, however, may be more easily obtained by differences between the external light sensing data and the internal light sensing data provided by the external light sensing unit 152 and the internal light sensing unit 153.

The first buffer 432 shown in FIG. 5 stores a group of reference data including background sensing data V_b_th_high, V_b_th_low, touch position sensing data ΔVs_th_high, ΔVs_th_low, amplification gain AG, AGmax, AGmin, ΔAG, backlight control level signal BLC, BLC_th_high, BLC_th_low, ΔBLC, gate voltage Vg and ΔVg for the first controller 431.

The gate voltage adjusting unit 433 adjusts the gate voltage Vg signal 433a to stabilize the background sensing data V_b, based on the reference data V_b_th_high and V_b_th_low, so that the touch position sensing data ΔVs maintains a constant level. The adjusted gate voltage signal 433a is applied to the gate electrodes of the touch sensors belonging to the touch sensing unit 151 shown in FIG. 4.

The amplification gain adjusting unit 434 adjusts the amplification gain AG 434a to stabilize the touch position sensing data ΔVs, based on the reference data ΔVs_th_high and ΔVs_th_low. The adjusted amplification gain AG 434a is applied to the readout unit 210 shown in FIG. 4.

The backlight adjusting unit 435 adjusts a backlight control level signal BLC 435a, which controls a light amount of the backlight, to stabilize the touch position sensing data ΔVs, based on the reference data BLC_th_high and BLC_th_low.

Figure 7:
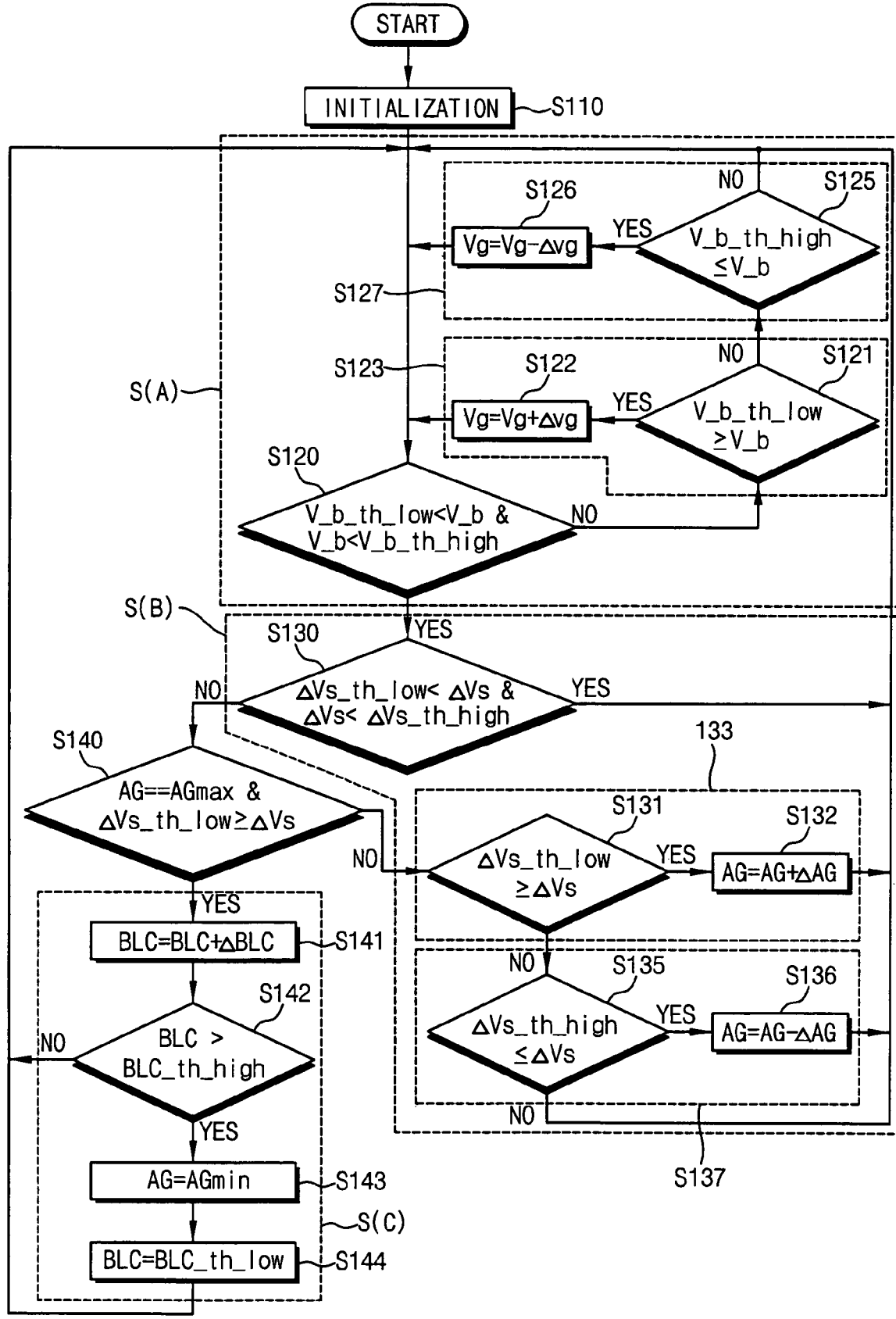
FIG. 7 is a flow chart illustrating an exemplary operation of the sensing signal adjusting unit in FIG. 5.

FIG. 7 is a flow chart illustrating operation of the sensing signal adjusting unit in FIG. 5.

Referring to FIG. 7, the first controller 431 of the sensing signal adjusting unit 430 is initialized (step S110). The first controller 431, for example, initializes a low threshold value BLC_th_low of the backlight control factor BLC with a light level corresponding to a standard backlight current of DC 15 mA, and initializes an amplification gain AG with a middle amplification gain AGmid that is a mean value of a maximum amplification gain AGmax and a minimum amplification gain AGmin.

Then, the first controller 431 examines whether the background sensing data V_b exists between a predetermined high threshold level V_b_th_high and a predetermined low threshold level V_b_th_low (step S120).

If the background sensing data V_b is not between the predetermined high threshold level V_b_th_high and the predetermined low threshold level V_b_th_low, then the gate voltage adjusting unit 433 either increases the gate voltage Vg (step S123) or decreases the gate voltage Vg (step S127), in response to control signals from the first controller 431, so that the background sensing data V_b is stabilized.

More particularly, when the background sensing data V_b is lower than the low threshold level V_b_th_low (step S121), the gate voltage adjusting unit 433 increases the gate voltage Vg (step S122). When the background sensing data V_b is higher than the high threshold level V_b_th_high (step S125), the gate voltage adjusting unit 433 decreases the gate voltage Vg (step S126). Thus, as shown in step S(A) in FIG. 7, the background sensing data V_b may be kept within the certain range, between the predetermined high threshold level and the predetermined low threshold level, by adjusting the gate voltage Vg.

Once the condition of step S120 is satisfied, the first controller 431 obtains the touch position sensing data ΔVs from a difference between the external light sensing data from the external light sensing unit 152 and the internal light sensing data from the internal light sensing unit 153. The first controller 431 examines whether the touch position sensing data ΔVs, as obtained from the difference between the external and the internal light sensing data, exists between a predetermined high threshold level ΔVs_th_high and a predetermined low threshold level ΔVs_th_low (step S130).

If the touch position sensing data $\Delta Vs$ is not between a predetermined high threshold level $\Delta Vs\_th\_high$ and a predetermined low threshold level $\Delta Vs\_th\_low$, then the amplification gain adjusting unit 434 either increases the amplification gain AG (step S133) or decreases the amplification gain (step S137), in response to control signals from the first controller 431, so that the background sensing data $\Delta Vs$ is stabilized.

More particularly, when the touch position sensing data $\Delta Vs$ is lower than the low threshold level $\Delta Vs\_th\_low$ (step S131), the amplification gain adjusting unit 434 increases the amplification gain AG (step S132). When the touch position sensing data $\Delta Vs$ is higher than the high threshold level $\Delta Vs\_th\_high$ (step S135), the amplification gain adjusting unit 434 decreases the amplification gain AG (step S136). Thus, as shown in step S(B) in FIG. 7 the touch position sensing data $\Delta Vs$ may be kept within the certain range, between the predetermined high threshold level and the predetermined low threshold level, by adjusting the amplification gain AG.

When an amount of light is so small that the background sensing data $V\_b$ is slightly different from the object sensing data $V\_o$ even though the amplification gain AG is set to be maximum, the touch position sensing data $\Delta Vs$ is lower than the low threshold level $\Delta Vs\_th\_low$. When the touch position sensing data $\Delta Vs$ is lower than the low threshold level $\Delta Vs\_th\_low$ in spite of the amplification gain AG being set to maximum (step S140), the first controller 431 controls the backlight adjusting unit 435 to increase the backlight control factor BLC in order to brighten the backlight (step S141). Therefore, the backlight control factor BLC is adjusted in a range that is lower than a highest threshold level BLC_th_high in order to maintain the touch sensing data $\Delta Vs$ at a constant level. In other words, the first controller 431 changes an operation mode from the shadow mode to the backlight mode. When the backlight control factor BLC increases over the high threshold level BLC_th_high (step S142), the amplification gain AG is set to be a minimum amplification gain AGmin (step S143) and the backlight control factor BLC is initialized to be the low threshold level BLC_th_low (step S144). In other words, the first controller 431 changes the operation mode from the backlight mode to the shadow mode.

As shown in step S(C), the touch position sensing data $\Delta Vs$ may be kept within the certain range between the predetermined high threshold level and the predetermined low threshold level, by adjusting the backlight brightness.

As described above, the touch position sensing data $\Delta Vs$ is easily obtained by maintaining the touch position sensing data $\Delta Vs$ to be at a specific level, within the predetermined range. After adjusting the control signals including the gate voltage Vg, the amplification gain AG, and the backlight control factor BLC, the sensing signal adjusting unit 430 applies the update control signal 430a to the touch position detecting unit 450.

Figure 8:
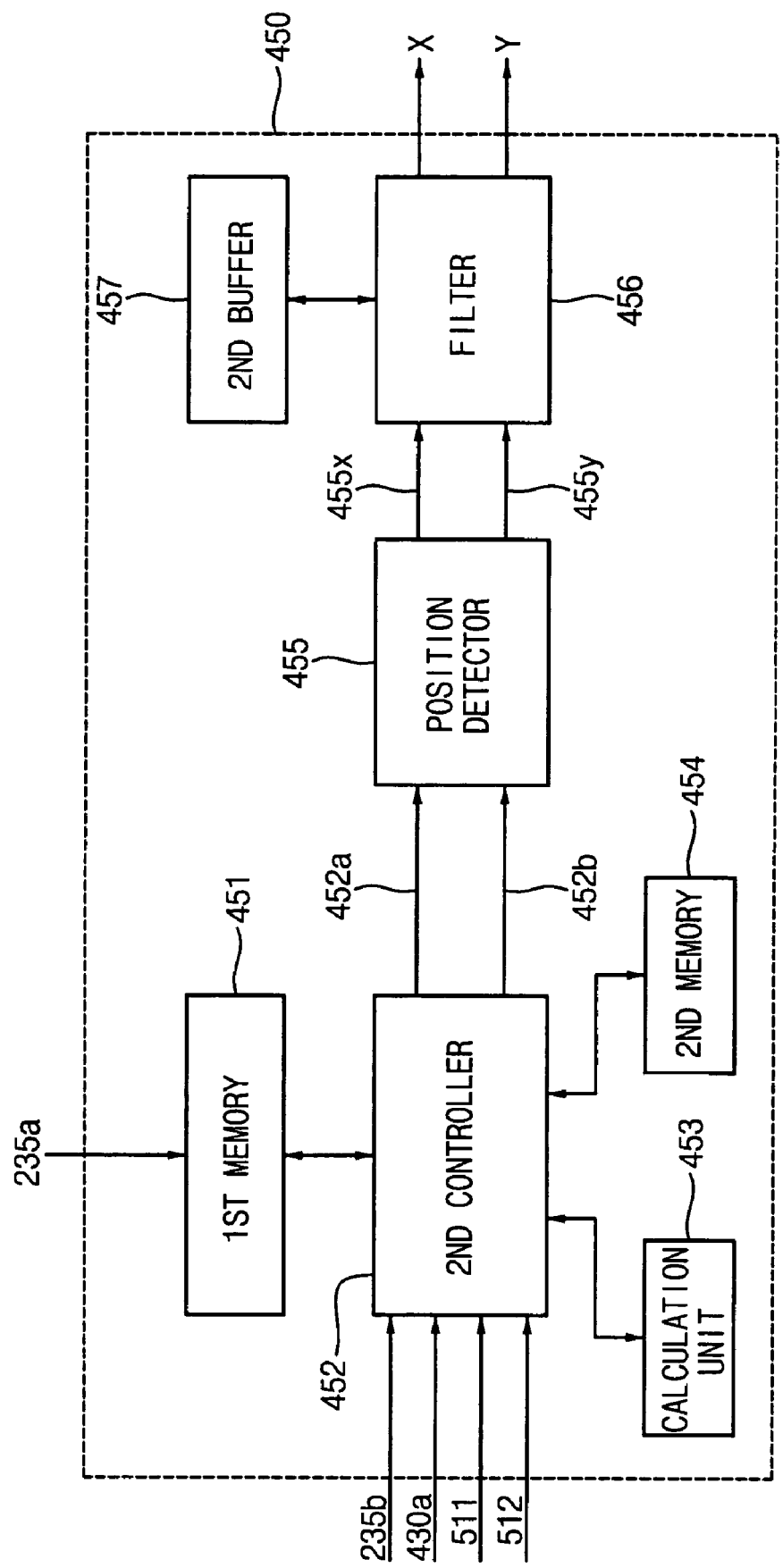
FIG. 8 is a block diagram illustrating the exemplary touch position detecting unit in FIG. 4.

FIG. 8 is a block diagram illustrating the exemplary touch position detecting unit in FIG. 4.

Referring to FIG. 8, the touch position detecting unit 450 includes a first memory 451, a second controller 452, a calculation unit 453, a second memory 454, a position detector 455, a filter 456, and a second buffer 457.

The first memory 451 stores the touch sensing data 235a provided by the sensor control unit 230. The touch sensing data 235a is sensed data sensed by the touch sensing unit 151.

The second controller 452 decides whether the touch sensing data 235a stored in the first memory 451 is to be transferred to and subsequently stored in the second memory 454. This decision is based on the update control signals 235b, 430a, 511, and 512 provided to the second controller 452 corresponding to certain predetermined operating conditions. The data stored in the second memory 454 corresponds to the reference data.

The update control signals include the post-event sensing signal 235b, the update control signal 430a, the turn-on signal 511, and the wake-up signal 512.

The post-event sensing signal 235b from the sensor control unit 230 is processed from the post-event sensing signal 154a from the post-event sensing unit 154. The post-event sensing signal 235b indicates that the physical object is detached from the touch screen region TSA. The update control signal 430a is provided by the sensing signal adjusting unit 430 as previously described. The turn-on signal 511 turns on a system including the touch screen display device according to the present invention. The wake-up signal 512 wakes up the system from a sleep mode.

Accordingly, the post-event sensing signal 235b is provided by the sensor control unit 230, and the update control signal 430a comes from the first controller 431. The turn-on signal 511 and the wake-up signal 512 may be generated in the sensing signal adjusting unit 430 or may be provided externally.

The calculation unit 453 is operated, according to a control of the second controller 452. That is, when receiving the post-event signal 235b, the second controller 452 examines whether the touch sensing data 235a stored in the first memory 451 is in the backlight mode or in the shadow mode.

For example, in the backlight mode, the second controller 452 updates the second memory 454 with the touch sensing data 235a, so that the previous reference data stored in the second memory 454 is replaced with the touch sensing data 235a, which corresponds to a new reference data. In the shadow mode, however, the second controller 452 controls the calculation unit 453, and then decides whether or not to update the reference data stored in the second memory 454 with the touch sensing data 235a, according to the calculation result of the calculation unit 453. An exemplary calculation process of the calculation unit 453 will be further described below with respect to FIG. 9.

Thus, the second memory 454 stores the touch sensing data 235a when directed by the second controller 452, so that the previous reference data may be replaced with the touch sensing data 235a.

The position detector 455 detects position data 455x and 455y which have the highest values corresponding to differences between the touch sensing data 452a stored in the first memory 451 and the reference data 452b stored in the second memory 454, according to a control of the second controller 452. The position data 455x and 455y correspond, for example, to coordinates of the touch screen surface in the touch screen region TSA. For example, the position detector 455 obtains the position data 455x and 455y, based on the update control signals, by using a maximum difference between a reference data 452b stored in the second memory 454 that corresponds to an n-th frame sensing data, and an (n+i)-th frame sensing data 452a stored in the first memory 451.

The filter 456 eliminates a noise element by comparing the previously detected position data, such as from a prior frame, with the currently detected position data. As described above, the position data X and Y, corresponding to the touch position by a physical object, etc. on the touch screen region TSA, may be eventually obtained.

Figure 9:
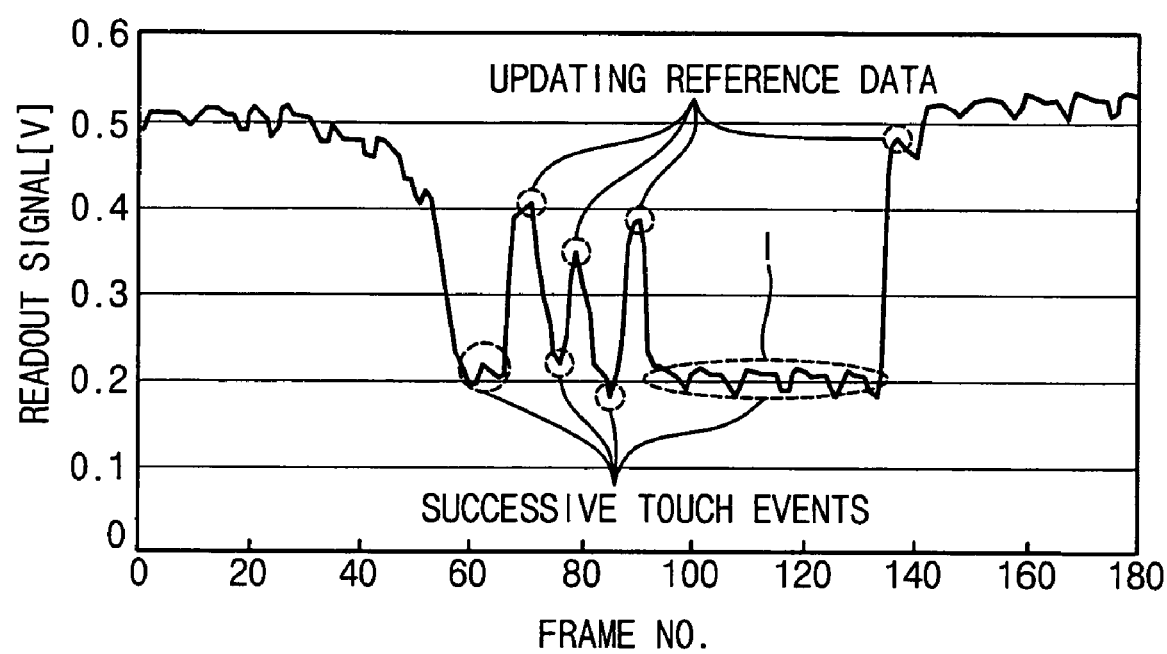
FIG. 9 is a graph illustrating a process to determine update times by an operation unit in FIG. 8 in a shadow mode.

FIG. 9 is a two-dimensional graph illustrating a process to determine update times by the exemplary calculation unit 453 in FIG. 8 in the shadow mode.

In FIG. 9, the x-axis of the graph represents frames, while the y-axis represents a voltage magnitude of the touch sensing data corresponding to any touch position in the touch screen region TSA.

As shown in FIG. 9, during a touch event at a certain position, the lowest touch sensing data, that is, the touch position sensing data with a lowest voltage, has a magnitude of about 0.2V. During successive touch events, the highest levels of the touch sensing data have a range from about 0.35V to about 0.4V.

Thus, the touch sensing data are traced from the lowest level of about 0.2V at the touch event, to the highest level of about 0.4V. Then, the reference data saved in the second memory 454 are replaced with the touch sensing data, at the time when the touch sensing data reach the highest level. Such a process may be arranged as follows in Expression 1.

$$\phi_n = Mag_n(X_0, Y_0) - Mag_0(X_0, Y_0) \qquad <\text{Expression 1}>$$

In Expression 1, $(X_0, Y_0)$ represents two dimensional coordinates of an X-axis and Y-axis of a touch position detected right before the touch event ends. The $Mag_0(X_0, Y_0)$ represents touch sensing data of the coordinates $(X_0, Y_0)$. The $Mag_n(X_0, Y_0)$ represents touch sensing data of the coordinates $(X_0, Y_0)$ at the n-th frame period after the touch event is over. The number n increases by 1 each frame after the touch event ends, until the reference data is replaced with new reference data. In summary, the $\phi_n$ is equal to the difference between the $Mag_0(X_0, Y_0)$ and $Mag_n(X_0, Y_0)$.

$$\phi max_n = MAX\{\phi_1, \phi_2, \ldots, \phi_n\} \qquad <\text{Expression 2}>$$

In Expression 2, $\phi max_n$ represents a maximum among the $\Phi n$. Thus, the largest difference between the $Mag_0(X_0, Y_0)$ and $Mag_n(X_0, Y_0)$ is equal to $\phi max_n$.

<Expression 3>

If $\phi_{n<\phi max n}$ and $\phi max_n > \epsilon$, then the reference frame data stored in the second memory 454 is updated by the touch sensing data 235a stored in the first memory 451.

$\epsilon$ is a critical degree in that although the $\Phi n$ stops increasing, the reference data is not replaced or updated, if the $\phi max_n$ is not over $\epsilon$. For example, as shown by a part of the graph in FIG. 9, referred to as section I, the reference data is not updated, when the $\phi max_n$ is smaller than $\epsilon$.

Figure 10:
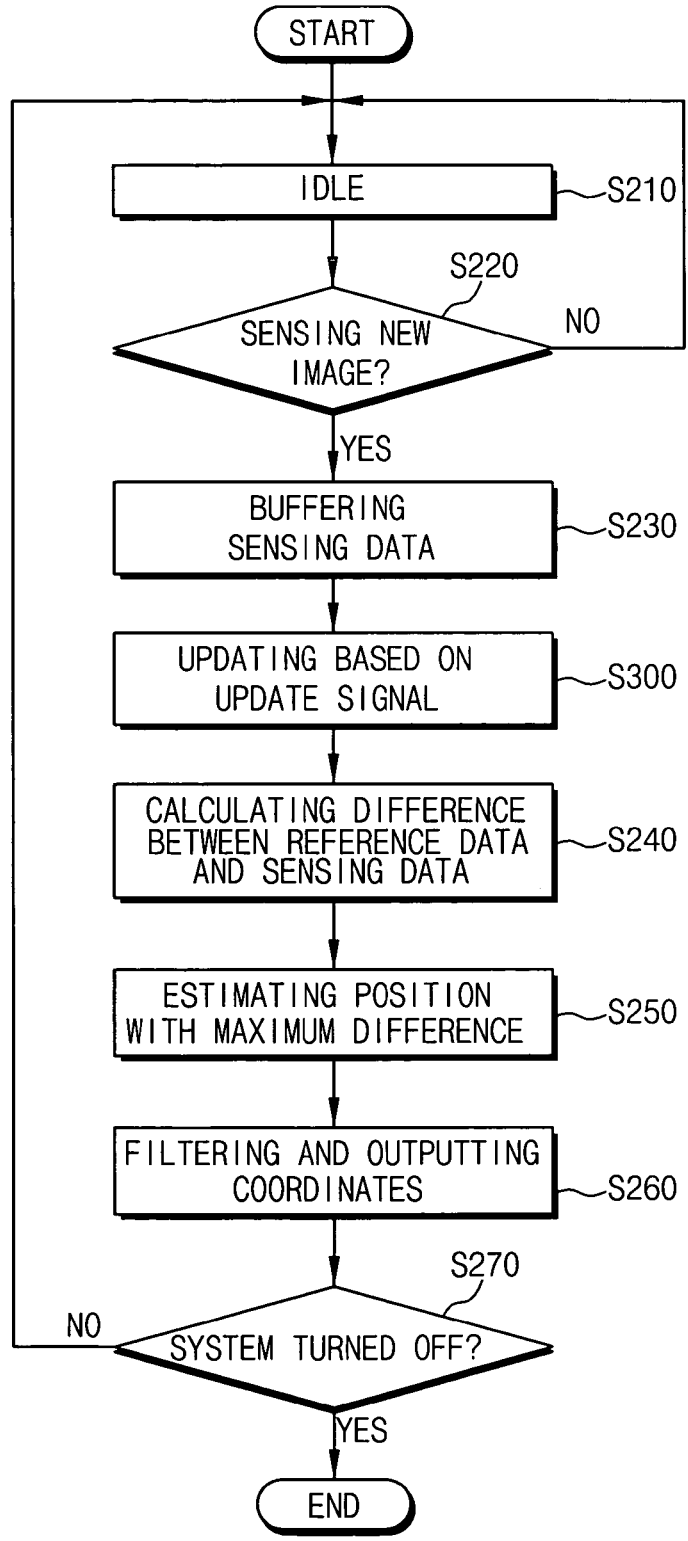
FIG. 10 is a flow chart illustrating an exemplary touch position detecting process by the display device in FIG. 4.

FIG. 10 is a flow chart illustrating an exemplary touch position detecting process by the display device in FIG. 4.

Referring to FIGS. 4, 8, and 10, a new touch event on the touch screen region TSA in an idle status (step S210) leads the readout unit 210 to provide the sensing data group 210a by the frame to the sensor control unit 230 (step S220). The sensor control unit 230 stores the touch sensing data 235a in the first memory 451 (step S230).

The second controller 452 determines whether the reference data stored in the second memory 454 is updated with the touch sensing data 235a, based on the update control signals (step S300).

Figure 11:
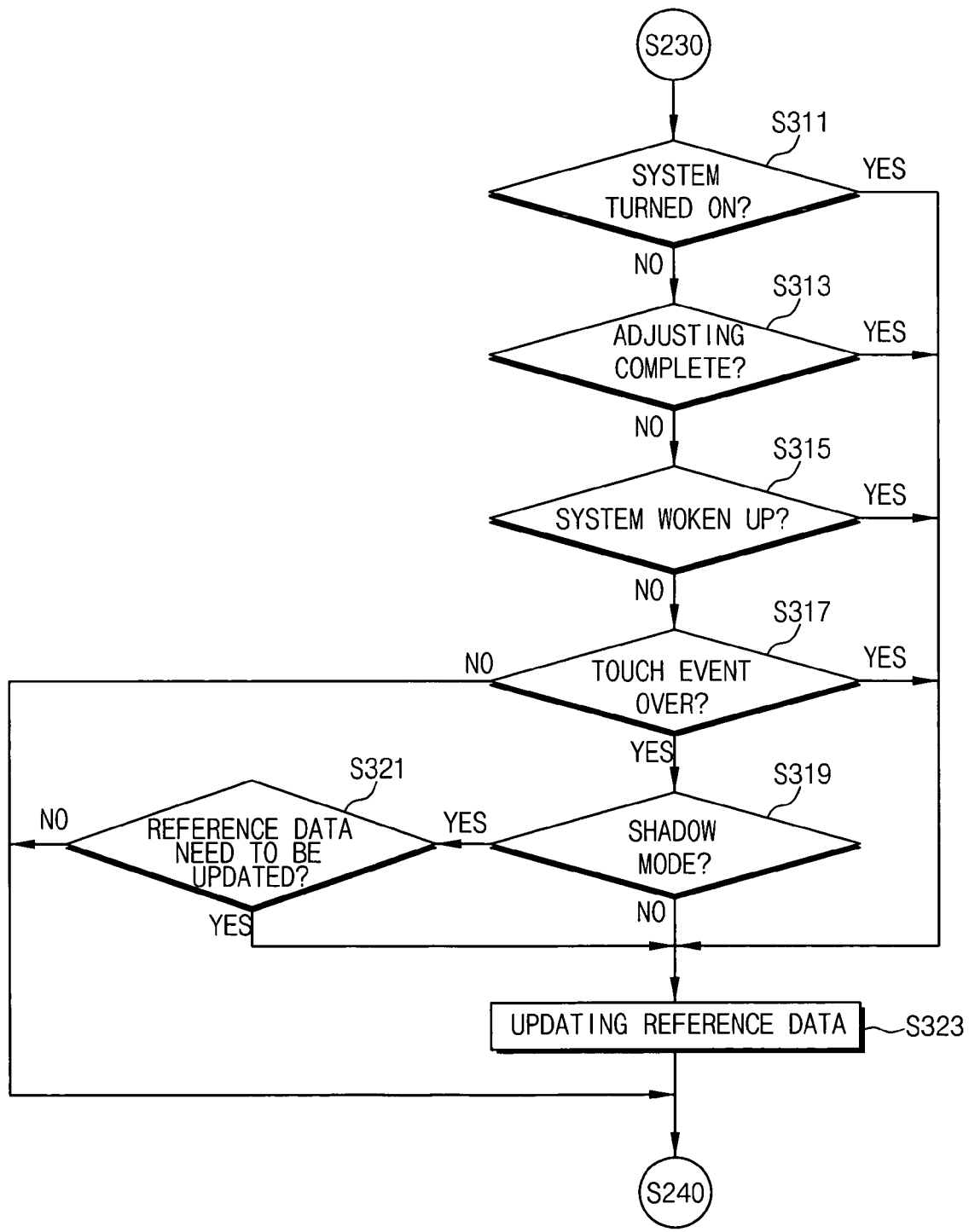
FIG. 11 is a detailed flow chart of a process of updating based on update signal as shown in step S300 in FIG. 10.

FIG. 11 is a detailed flow chart of step S300 in FIG. 10.

Referring to FIG. 11, the system turn-on signal 511 (step S311), the update control signal 430a from the sensing signal adjusting unit 430 (step S313), and the system wake-up signal 512 (step S315) are respectively examined to be inputted or not.

When any control signal is inputted at the steps S311, S313, and S315, the second controller 452 updates the reference data of the second memory 454 with the touch sensing data 235a stored in the first memory 451. For example, when the update control signal 430a is inputted at an n-th frame, the second controller 452 updates the reference data of the second memory 454 with the n-th frame sensing data stored in the first memory 451. In other words, the n-th frame sensing data becomes the reference data.

On the other hand, when no control signal is inputted at the steps S311, S313, and S315, the second controller 452 does not update the reference data stored in the second memory 454.

The second controller 452 examines whether the post-event sensing signal 235b is inputted from the sensor control unit 230 (step S317). When the post-event sensing signal 235b is inputted, then, the second controller 451 examines whether the device is under the shadow mode or not (step S319). If not under the shadow mode, then the device is under the backlight mode, so that the second controller 452 updates the reference data of the second memory 454 with the touch sensing data 235a stored in the first memory 451, based on the post-event sensing signal 235b (step S323).

For example, when n-th frame is in a backlight mode, the second controller 452 updates the reference data stored in the second memory 454 with the n-th frame sensing data stored in the first memory 451. When the step S319 shows that the device is under the shadow mode, the second controller 452 determines whether the reference data stored in the second memory 454 would be updated with the touch sensing data 235a stored in the first memory 451, based on a calculation result of the calculation unit 453 (step S321).

In summary, after deciding whether to update the reference data stored in the second memory 454 with the touch sensing data 235a in the first memory 451, the touch sensing data 235a is treated according to the decision.

Then, the second controller 452 provides the position detector 455 with the touch sensing data 452a from the first memory 451 and the reference data 452b in the second memory 454.

Referring again to FIG. 10, the position detector 455 determines a difference between the touch sensing data 452a and the reference data 452b (step S240), and then, detects a position data having the maximum difference (step 250).

For example, the position detector 455 detects touch position by using the (n+1)-th frame sensing data of the first memory 451 and the reference data that corresponds to the n-th frame sensing data from the second memory 454.

The filter 456 eliminates a certain noise element by comparing the previously detected position data, stored in the second buffer 457, with the position data currently detected by the position detector 455 (step S260).

Then, the previous steps are repeated according to whether the system is turned off (step S270). Accordingly, the position data corresponding to the touch position on the touch screen region TSA may be obtained.

As described above, an embodiment of the invention updates the reference data with the touch sensing data based on the prescribed update control signal according to the operation conditions, and detects the touch position by using the difference between the touch sensing data and the reference data.

The differences between the touch sensing data and the reference data are roughly uniform, so that an embodiment according to the invention improves a signal-to-noise ratio ("SNR") and facilitates detection of the touch position. Further, an embodiment according to the present invention simplifies the process and reduces detection duration. As a result, a hardware implementation and a software implementation of an embodiment of the present invention may be more easily accomplished.

While the exemplary embodiments of the present invention and its advantages have been described in detail, it should be understood that various changes, substitutions and alterations can be made herein without departing from the scope of the invention as defined by appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A touch position detecting device comprising:
a touch sensing unit which senses a touch event and outputs a sensing data;
a sensor control unit which receives n-th frame sensing data from the touch sensing unit;
a sensing signal adjusting unit which receives the n-th frame sensing data and adjusts a level of the n-th frame sensing data to be at a constant level by determining a difference between an external light sensing data and an internal light sensing data;
a touch position detecting unit which receives the n-th frame sensing data, stores the n-th frame sensing data in a first memory, updates a reference data stored in a second memory with the n-th frame sensing data provided from the touch sensing unit based on an update signal, and detects a touch position by determining a difference between the reference data and an (n+i)-th frame sensing data provided from the touch sensing unit, wherein
'n' and 'i' are natural numbers,
the reference data corresponds to the n-th frame sensing data, and
the n-th frame sensing data is previous to the (n+i)-th frame sensing data.

2. The touch position detecting device of claim 1, wherein the update signal corresponds to a turn-on signal which turns on the touch position detecting device.

3. The touch position detecting device of claim 1, wherein the update signal comprises a wake-up signal which wakes up the touch position detecting device.

4. The touch position detecting device of claim 1, wherein the update signal comprises at least one of a turn-on signal which turns on the touch position detecting device, a wake-up signal which wakes up the touch position detecting device, a post-event sensing signal, and an update control signal from a sensing signal adjusting unit.

5. The touch position detecting device of claim 1, further comprising a post-event sensing unit which senses whether a physical object is detached from the touch sensing unit, and outputs a post-event sensing signal, wherein the touch position detecting unit updates the reference data with the n-th frame sensing data provided from the touch sensing unit, when the post-event sensing signal is applied to the reference update unit.

6. The touch position detecting device of claim 5, wherein the sensing data comprises a background sensing data corresponding to a sensing data with no touch event occurring, and the touch position detecting unit further comprises a calculation unit which decides whether to update the reference data with the n-th frame sensing data, when a level of an object sensing data corresponding to a sensing data of touch event is lower than a level of the background sensing data.

7. The touch position detecting device of claim 6, wherein the calculation unit decides whether to update the reference data, based on a difference of levels between object sensing data of a previous sensing data and object sensing data of a current sensing data.

8. The touch position detecting device of claim 7, wherein the calculation unit decides to update the reference data, when the difference of levels between the object sensing data of a previous sensing data and the object sensing data of a current sensing data is larger than a predetermined critical value.

9. The touch position detecting device of claim 7, wherein the calculation unit updates the reference data with the n-th frame sensing data when the difference of levels between the object sensing data of a previous sensing data and the object sensing data of a current sensing data stops increasing and then begins decreasing.

10. The touch position detecting device of claim 7, wherein the calculation unit updates the reference data with the n-th frame sensing data before the difference of levels between the object sensing data of a previous sensing data and the object sensing data of a current sensing data begins to decrease, when the difference of levels stops increasing and then begins decreasing.

11. The touch position detecting device of claim 1, wherein the sensing signal adjusting unit provides the update signal to the reference update unit when the sensing data is maintained at a constant level.

12. The touch position detecting device of claim 11, wherein, if the sensing data is not within a predetermined range, one of a gate voltage adjusting operation, an amplification gain adjusting operation, and a backlight adjusting operation is performed until the sensing data is within the predetermined range.

13. The touch position detecting device of claim 11, wherein the sensing signal adjusting unit further comprises at least one of a gate voltage adjusting unit, an amplification gain adjusting unit, and a backlight adjusting unit for adjusting the sensing data to fall within a predetermined range.

14. The touch position detecting device of claim 1, further comprising a filter which eliminated a noise element by comparing a previously detected touch position with a currently detected touch position.

15. A method of detecting touch position, comprising:
receiving an n-th frame sensing data and adjusting a level of the n-th frame sensing data to be at a constant level by determining a difference between an external light sensing data and an internal light sensing data;
updating a reference data with the n-th frame sensing data indicating that a touch event occurs, according to an update control signal externally provided; and
detecting a touch position data corresponding to a position at which the touch event occurs, by determining a difference between the reference data and a (n+i)-th frame sensing data, wherein
'n' and 'i' are natural numbers,
the reference data corresponds to the n-th frame sensing data, and
the n-th frame sensing data is previous to the (n+i)-th frame sensing data.

16. The method of claim 15, wherein touch position is detected on a touch screen liquid crystal display device.

17. The method of claim 15, further comprising:
generating a post-event sensing signal indicating that the touch event is over;
examining whether the method is performed under a shadow mode indicating that sensing data of external surroundings has higher level than sensing data of a touched object or a backlight mode, according to the post-event sensing signal; and
updating the reference data with the n-th frame sensing data, when the method is determined to be performed under the backlight mode indicating that the sensing data of the external surroundings has a lower level than the sensing data of the touched object.

18. The method of claim 17, further comprising deciding whether to update the reference data with the n-th frame sensing data, when the method is determined to be performed under the shadow mode.

19. A touch screen display device comprising:
a display panel which displays images by frame;
a sensing unit which senses a touch event by the frame to output a sensing data by the frame;
a sensing signal adjusting unit which receives an n-th frame sensing data from the sensing unit and adjusts a level of the n-th frame sensing data to be at a constant level by determining a difference between an external light sensing data and an internal light sensing data; and
a touch position detecting unit which updates a reference data with an n-th frame sensing data provided from the sensing unit, based on an update control signal, and which detects a touch position data corresponding to the touch event using the reference data and an (n+i)-th frame sensing data provided from the sensing unit,
wherein
'n' and 'i' are natural numbers,
the reference data corresponds to the n-th frame sensing data, and
the n-th frame sensing data is previous to the (n+i)-th frame sensing data.

20. The device of claim 19, wherein the sensing unit is integrated on the display panel.

21. The device of claim 20, wherein the display panel includes an array substrate, a color filter substrate, and a liquid crystal layer interposed between the array substrate and the color filter substrate, the sensing unit integrated into the array substrate.

22. The device of claim 19, wherein the touch position detecting unit comprises:
a controller which updates the reference data with the n-th frame sensing data, based on the update control signal;
a memory which stores the reference data; and
a position detecting unit which detects the touch position data by determining a difference between the reference data and the (n+i)-th frame sensing data.

23. The device of claim 22, wherein the sensing unit further comprises a first sensor which recognizes when an object is detached from the display panel, and outputs a post-event sensing signal indicating when the object is detached from the display panel, to the controller.

24. The device of claim 23, wherein the controller decides whether an operation mode is a shadow mode indicating that sensing data of external surroundings has a higher level than sensing data of a touched object, or whether an operation mode is a backlight mode indicating that the sensing data of the external surroundings has a lower level than the sensing data of the touched object, and the reference updating unit updates the reference data with the sensing data provided from the sensing unit, according to the operation mode, when the post-event sensing signal is received.

25. The device of claim 24, wherein the controller updates the reference data with the n-th frame sensing data, when the operation mode is determined to be the backlight mode.

26. The device of claim 24, wherein the device further comprises a calculation unit which decides whether to update the reference data with the n-th frame sensing data, when the operation mode is determined to be the shadow mode.

27. The device of claim 19, wherein the sensing data comprises an object sensing data corresponding to sensing data of a touch event and a background sensing data corresponding to sensing data without a touch event occurring, and further comprises a sensing signal adjusting unit which stabilizes a difference between the object sensing data and the background sensing data.

28. The device of claim 27, wherein the sensing signal adjusting unit provides the touch position detecting unit with an update signal, when the difference between the object sensing data and the background sensing data is stabilized.

29. The touch position detecting device of claim 1, wherein the touch sensing unit further comprises an external light sensing unit which generates an external light sensing signal and an internal light sensing unit which generates an internal light sensing signal, and the sensing signal adjusting unit compares an external light sensing data processed from the external light sensing signal with an internal light sensing data processed from the internal light sensing signal.

* * * * *